United States Patent

Sawahashi et al.

[11] Patent Number: 5,940,433
[45] Date of Patent: Aug. 17, 1999

[54] ACQUISITION METHOD AND SYSTEM OF SPREADING CODE

[75] Inventors: Mamoru Sawahashi, Yokohama; Akihiro Higashi; Kenichi Higuchi, both of Yokosuka, all of Japan

[73] Assignee: NTT Mobile Communications Network, Inc., Tokyo, Japan

[21] Appl. No.: 08/793,052

[22] PCT Filed: Jun. 12, 1996

[86] PCT No.: PCT/JP96/01589

§ 371 Date: Feb. 12, 1997

§ 102(e) Date: Feb. 12, 1997

[87] PCT Pub. No.: WO96/42147

PCT Pub. Date: Dec. 27, 1996

[30] Foreign Application Priority Data

Jun. 13, 1995 [JP] Japan .................................. 7-146190

[51] Int. Cl.[6] .................................................. H04K 1/00
[52] U.S. Cl. ...................... 375/206; 375/208; 375/200; 370/515; 370/516
[58] Field of Search ..................... 375/206, 209, 375/210, 208, 200, 367; 370/515, 342, 479, 516, 324, 350

[56] References Cited

U.S. PATENT DOCUMENTS

| | | | |
|---|---|---|---|
| 4,168,398 | 9/1979 | Matsuo et al. | 370/324 |
| 5,638,362 | 6/1997 | Dohi et al. | 375/206 |
| 5,729,571 | 3/1998 | Park et al. | 375/206 |

FOREIGN PATENT DOCUMENTS

| | | |
|---|---|---|
| 3-192837 | 8/1991 | Japan . |
| 5-014312 | 1/1993 | Japan . |
| 6-090222 | 3/1994 | Japan . |
| 8-032548 | 2/1996 | Japan . |
| 8-102698 | 4/1996 | Japan . |
| 8-223135 | 8/1996 | Japan . |

Primary Examiner—Stephen Chin
Assistant Examiner—Betsy L. Deppe
Attorney, Agent, or Firm—Brown Raysman Millstein Felder & Steiner LLP

[57] ABSTRACT

In a mobile communication system using spread spectrum, performing respective multiplications of an I and Q channel signals by a spreading code replica, integration over one spreading code period, and square-law detection of the integrated signals to remove data modulation components and residual carrier frequency components. The square-law detected signals are added to obtain signal power over one spreading code period while updating the clock phase of a digital control clock generator. The information of power is stored in a memory in an acquisition mode controller, and the clock phase of the digital control clock generator 30 is fixed at the spreading code replica phase at which a maximum correlation detection power over one spreading code period is obtained. Subsequently, a confirmation mode is started for confirming the spreading code acquisition phase. By thus providing the confirmation mode of the spreading code acquisition, the acquisition can be established in a short time with a low error acquisition probability, thereby enabling a tracking mode to be started soon.

12 Claims, 8 Drawing Sheets

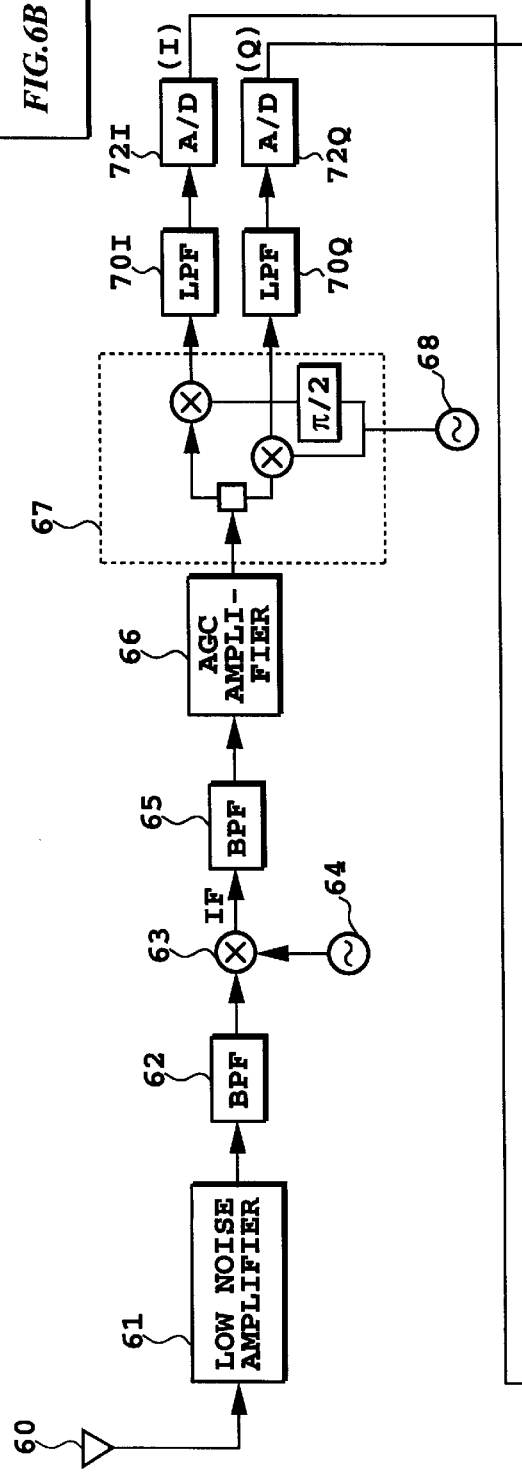

ACQUISITION METHOD AND SYSTEM OF SPREADING CODE

TECHNICAL FIELD

The present invention relates to an acquisition method and system of a spreading code, which is applicable to radio receivers in a CDMA (Code Division Multiple Access) carrying out the multiple access in a mobile communication system using a spread spectrum.

More particularly, the present invention relates to a technique for making decision or confirmation whether the acquisition of a received spreading code is established or not in a radio receiver in a mobile system adopting a direct sequence CDMA (DS-CDMA) performing the multiple access using the spread section technique.

BACKGROUND ART

The CDMA transmission is classified into a direct sequence (DS) method that spreads a conventionally modulated signal with a spreading code at a high rate, and a frequency hopping (FH) method. It is necessary for the FH method to divide each symbol into much smaller units called chips, and to switch the central frequency of each chip at a high rate. Since this makes it difficult to implement a device employing the FH method, the DS method is usually used.

DS-CDMA radio equipment, different from SCPC (Single Channel Per Carrier)/FDMA (Frequency Division Multiple Access) radio equipment or TDMA (Time Division Multiple Access) radio equipment, carries out at a transmitting side secondary modulation with a spreading code after data modulation, thereby transmitting a signal whose bandwidth is spread. On the other hand, at a receiving side, it restores a narrowband signal from the wideband received signal through a process called despreading, and demodulates the despread signal by a conventional method. The despreading at the receiving side requires to detect correlation between the received spreading signal and the spreading code sequence locally generated in the receiver.

Usually, it is necessary for the DS-CDMA receiver to generate a replica of the spreading code, and to synchronize the spreading code replica with the spreading code in the received signal. The synchronization process of the spreading code is divided into acquisition and tracking. Since the spreading code such as a Gold code or the like can obtain the autocorrelation only within a range of plus minus one chip, the acquisition must reduce the phase difference between the spreading code sequence in the received signal and the spreading code replica within a range much smaller than plus minus one chip, and then the tracking keeps the phase difference within this range.

The acquisition method is described, for example, in M. K. Simon, J. K. Omura, R. A. Scholtz, and B. K. Levitt, "Spread Spectrum Communications", Vol. III, Computer Science Press, 1985.

Next, the acquisition method that constitutes a prior art of the present invention will be described with reference to FIG. 1.

FIG. 1 is a block diagram of serial code acquisition process using a sliding correlator. In this figure, the reference numeral 1 designates an input terminal of the spread signal, 2 designates an output terminal for outputting a signal indicating that the acquisition has been established, 3 designates a multiplier, 5 designates an integrator/dump circuit, 6 designates a square-law detector, 7 designates a threshold decision circuit, 8 designates a digital control clock generator, and 9 designates a spreading code replica generator.

The operation of the sliding correlator as shown in FIG. 1 is as follows. To achieve the acquisition of the spreading code, the received signal input to the input terminal 1 is multiplied by the spreading code replica by the multiplier 3, and the output of the multiplier 3 is integrated for a certain time by the integrator/dump circuit 5, thereby obtaining a correlation output. The correlation output undergoes square-law detection by the square-law detector 6, and the detected output is decided whether it exceeds a threshold or not by the threshold decision circuit 7. Thus, a decision is made whether the acquisition of the spreading code has been established or not.

In a single dwell system, in which the integrator/dump circuit 5 has only one integration time (usually one symbol interval), the product of the received signal and the spreading code replica is integrated for only a dwell time.

In an actual propagation environment, however, since there are variation of the received signal level and effect of noise, acquisition errors can occur in such a manner that the acquisition fails at a true phase synchronized position, or is considered to be occurred at a wrong phase position of the spreading code replica. To reduce such errors and to increase the accuracy of the acquisition detection, it is necessary to lengthen the dwell time. The time period needed for the acquisition, however, increases with the integration time.

Generally speaking, the integration time cannot be taken long enough because the acquisition must be completed in the acquisition time period required for the system. Therefore, in an actual system, if any error acquisition is established in which the phase of the received spreading code does not coincide with that of the spreading code replica, reacquisition must be carried out because the data modulation cannot be performed correctly even if the tracking mode is started following the error acquisition. Thus, it is essential for the acquisition of the spreading code to reduce error when the acquisition is carried out on the actual propagation environment.

FIG. 2 is a block diagram showing details of the conventional sliding correlator as shown in FIG. 1, which performs the operation as described above in connection with FIG. 1. Specifically, the in-phase (I) component and the quadrature (Q) component of the spread modulated signal passed through quadrature detection are deprived of the harmonic components, and passed through an A/D converter (not shown) to be converted into digital values. The I and Q channel signals independently undergo complex multiplication by the spreading code replica, and are integrated for a certain time period. The two integrated signals are square-law detected, and then added to obtain the power of the correlation detection signal. Whether the acquisition is established or not is decided based on whether the power of the correlation detection signal exceeds the threshold or not. When the correlation detection signal is smaller than the threshold, the phase of the clock signal of the digital control clock generator 8 is advanced by one chip interval, and the correlation is detected again between the spreading code replica with its phase advanced and the spread modulated signal, followed by the threshold decision processing. The foregoing operation is repeated until the correlation detection signal (its power) exceeds the threshold value.

DISCLOSURE OF THE INVENTION

As described above with reference to FIG. 1, there is a tradeoff between reducing the acquisition time and achieving sufficient reliability without error acquisition, and it is essential to implement an acquisition method that can achieve acquisition with a small probability of error within an allowed acquisition time period given in the system.

Therefore, in view of the foregoing description, the object of the present invention is to provide an acquisition method and system of a spreading code which can achieve highly reliable acquisition with little error within a limited acquisition time.

First aspect of the present invention is directed to an acquisition method of a spreading code, which receives a wideband spread signal generated using a spreading code with a rate higher than an information rate, detects correlation between a received signal and a spreading code replica at a receiving side, and decides whether acquisition of the spreading code is established or not based on the correlation, the method comprising:

a first step of detecting a maximum correlation output by carrying out search at respective chip phases over one spreading code period; and a second step of carrying out correlation detection again at a spreading code phase at which the maximum correlation output is detected to decide that the acquisition is established when signal power is obtained exceeding a particular ratio of the maximum correlation output which is detected at the first step.

Here, the maximum correlation output detected in the first step may be information of power obtained by calculating correlation between the spreading code replica and I component of the received signal and correlation between the spreading code replica and Q component of the received signal, by square-law detecting the two correlations, and by adding square-law detected outputs.

If a decision is made at the second step that the acquisition has not yet been established, a third step having the same processing contents as the second step may be carried out.

If a decision is not made at the third step that the acquisition has been established, the first step may be carried out again, and if a decision is made at the third step that the acquisition has been established, the second step may be carried out again.

If a decision is made at the second step that the acquisition has been established, a tracking mode may be executed.

Second aspect of the present invention is directed to an acquisition method of a spreading code in a direct sequence CDMA system, in which a pilot symbol of a known pattern for detecting a transfer characteristic of a transmission path at a receiving side is inserted into a transmission signal at a fixed interval, the acquisition method comprising:

synchronization detection step of synchronizing a spreading code received at the receiving side with a spreading code replica generated at the receiving side by detecting correlation between the spreading code and the spreading code replica; and confirmation decision step of confirming, after completing the synchronization detection step, whether the synchronization of the spreading code with the spreading code replica is truly established depending on whether a frame synchronization can be detected using the pilot symbol.

Here, the synchronization detection step may be same as any one of the acquisition methods described above.

A third aspect of the present invention is directed to a spreading code synchronization system, which receives a wideband spread signal generated using a spreading code with a rate higher than an information rate, detects correlation between a received signal and a spreading code replica at a receiving side, and decides whether acquisition of the spreading code is established or not based on the correlation, the system comprising:

a first processing means for detecting a maximum correlation output by carrying out search at respective chip phases over one spreading code period; and a second processing means for carrying out correlation detection again at a spreading code phase at which the maximum correlation output is detected to decide that the acquisition is established when signal power is obtained exceeding a particular ratio of the maximum correlation output which is detected by the first processing means.

Here, the maximum correlation output detected by the first processing means may be information of power obtained by calculating correlation between the spreading code replica and I component of the received signal and correlation between the spreading code replica and Q component of the received signal, by square-law detecting the two correlations, and by adding square-law detected outputs.

The spreading code synchronization system may further comprise a third processing means for carrying out the same processing contents as the second processing means to deal with a case where a decision is made by the second processing means that the acquisition has not yet been established.

If the third processing means does not make a decision that the acquisition has been established, the first processing means may be activated again, and if the third processing means makes a decision that the acquisition has been established, the second processing means may be activated again.

If the second processing means makes a decision that the acquisition has been established, a tracking mode may be executed.

In a fourth aspect of the present invention, there is provided a spreading code synchronization system in a direct sequence CDMA system, in which a pilot symbol of a known pattern for detecting a transfer characteristic of a transmission path at a receiving side is inserted into a transmission signal at a fixed interval, the spreading code synchronization system confirming that an acquisition is established at the receiving side, the spreading code synchronization system comprising:

synchronization detection means for synchronizing a spreading code received at the receiving side with a spreading code replica generated at the receiving side by detecting correlation between the spreading code and the spreading code replica; and confirmation decision means for confirming, after establishing synchronization by the synchronization detection means, whether the synchronization of the spreading code with the spreading code replica is truly established depending on whether a frame synchronization can be detected using the pilot symbol.

Here, the synchronization detection means may carry out any one of the acquisition methods described above.

Fifth aspect of the present invention is directed to a spreading code synchronization system including a correlator for detecting correlation between a spreading code in a spread spectrum signal which is spread into a wideband signal using the spreading code with a rate higher than an information rate, and a spreading code replica at a receiving side, the correlator comprising:

first correlation detecting means for detecting a maximum correlation peak power by carrying out correlation detection at respective spreading code phases over one spreading code period;

replica phase holding means for holding a phase of the spreading code replica at which the maximum correlation peak power is detected by the first correlation detecting means;

second correlation detecting means for carrying out, at a next spreading code period, correlation detection at the phase of the spreading code replica held in the replica phase holding means; and decision means for carrying out threshold decision by comparing correlation detection power obtained by the second correlation detecting means and a threshold value corresponding to the maximum correlation peak power obtained by the first correlation detecting means, wherein a decision is made that the acquisition is established when the decision means decides that the correlation detection power exceeds the threshold value.

In the fifth aspect of the present invention, the spreading code synchronization system may be further comprising:

third correlation detecting means for carrying out correlation detection at the phase of the spreading code replica held in the replica phase holding means; and another decision means for carrying out threshold decision by comparing correlation detection power obtained by the third correlation detecting means and a threshold value corresponding to the maximum correlation peak power obtained by the first correlation detecting means, wherein the decision means decides that the acquisition is established when the correlation detection power exceeds the threshold value, wherein if the correlation detection power is not obtained, a processing by the third correlation detecting means is started, and if the another decision means decides that the correlation detection power exceeds the threshold value, the correlation detection by the second correlation detecting means is carried out, and wherein if the correlation detection power is not obtained, the correlation detection over one spreading code period is restarted by the first correlation detecting means.

According to the present invention, the confirmation mode of the spreading code acquisition is provided in establishing the acquisition of the spreading code. This makes it possible to reduce the error acquisition even in a short acquisition time, and to achieve smooth and fast transition to the following tracking mode.

BRIEF DESCRIPTION OF THE DRAWINGS

FIGS. 6A and 6B are block diagrams showing the overall configuration of a receiver incorporating the hardware achieving the same function as the circuit as shown in FIG. 4.

BEST MODE FOR CARRYING OUT THE INVENTION

FIRST EMBODIMENT IN ACCORDANCE WITH THE PRESENT INVENTION

Figure 1:
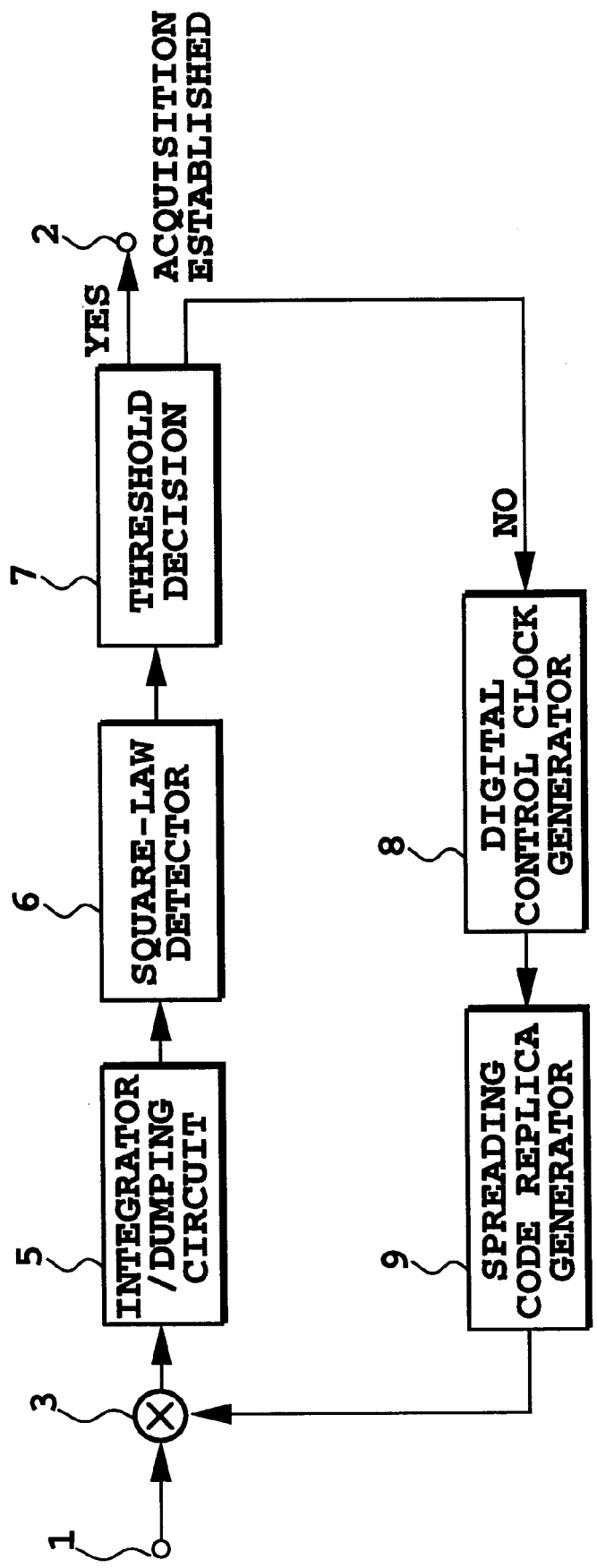
FIG. 1 is a block diagram showing an example of a conventional sliding correlator.
Figure 2:
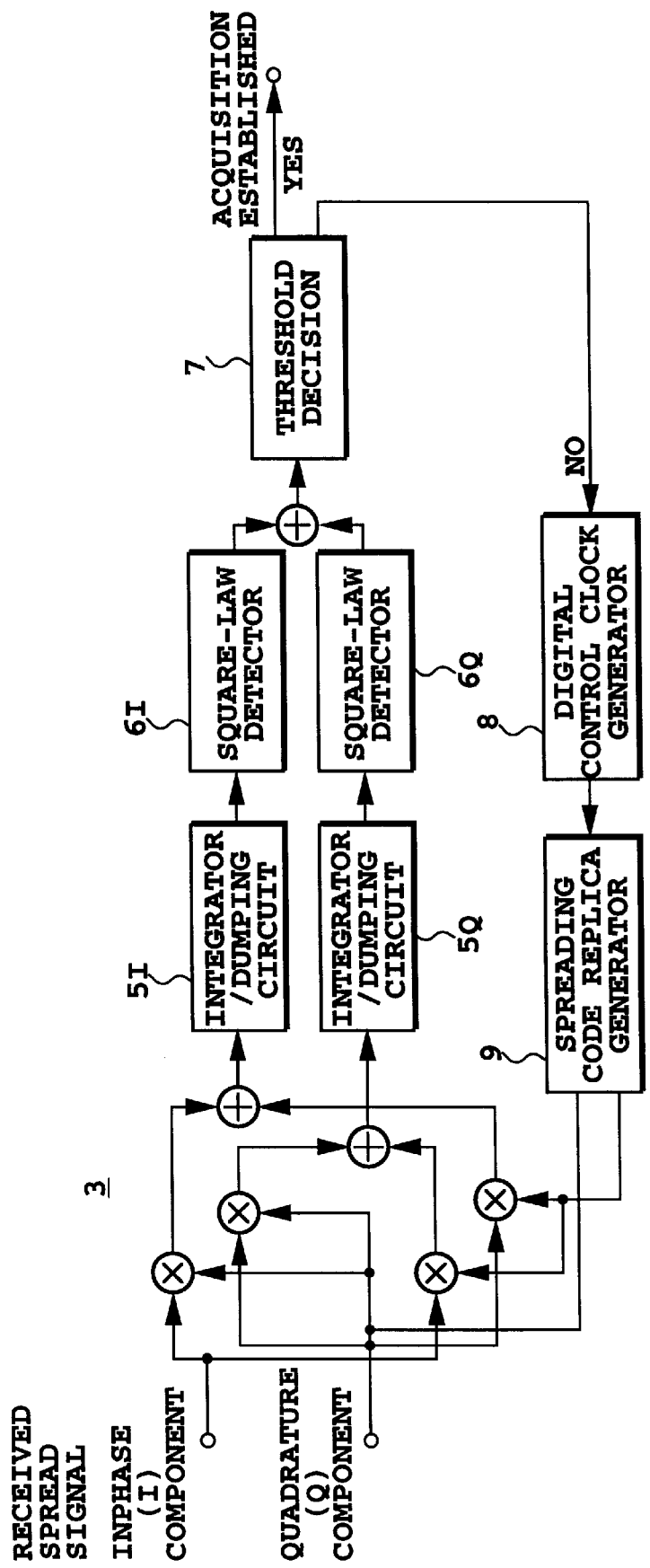
FIG. 2 is a block diagram showing the sliding correlator as shown in FIG. 1 more concretely.
Figure 3:
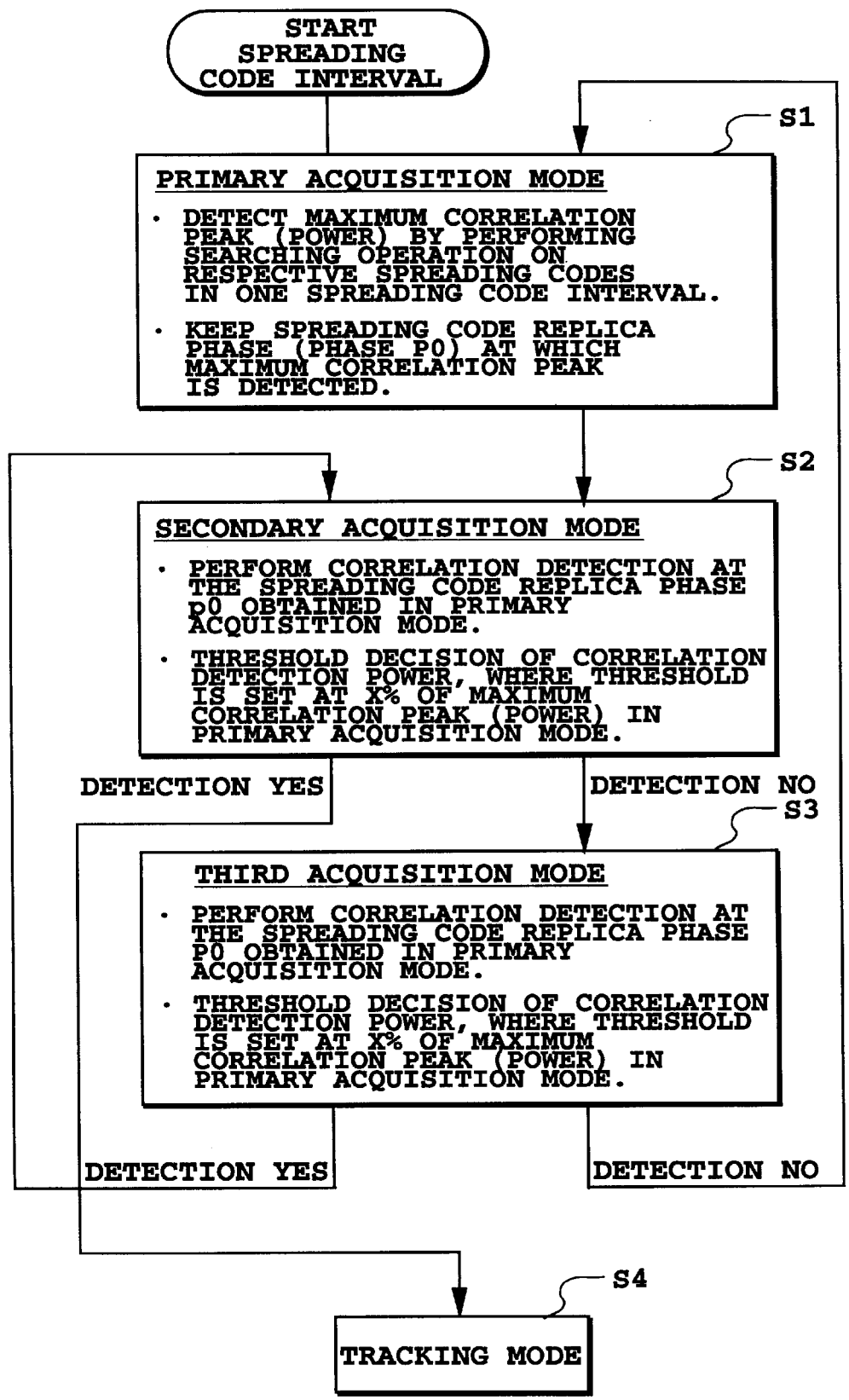
FIG. 3 is a flowchart showing a first embodiment of the present invention.

FIG. 3 is a flowchart showing a basic algorithm of the spreading code acquisition method in accordance with the present invention.

As shown in FIG. 3, the maximum correlation peak (power) is detected at step S1 by multiplying the spreading code included in the wideband received signal and the spreading code replica generated in the receiver, by integrating the product for a certain time, and by carrying out search on the resultant correlation detection values over one spreading code period. Then, the chip phase (P0) of the replica, at which the maximum correlation peak (power) is detected, is stored in the receiver.

At step S2, the correlation detection is carried out between the received signal and the spreading code replica at the received replica phase P0 in the succeeding spreading code periods. If the resultant correlation detection power exceeds a given threshold, that is, X % of the maximum power obtained by the correlation detection, the decision is made that the acquisition is established, thereby leaving the confirmation mode (the secondary acquisition mode).

If only the correlation detection power less than the threshold is obtained in step S2, the correlation detection is carried out again at step S3, the third acquisition mode, at the spreading code replica phase obtained in the primary acquisition mode in the next spreading code period. If the resultant correlation detection power obtained at step S3 exceeds the given threshold, that is, X % of the maximum power obtained by the correlation detection at the primary acquisition mode at step S1, the processing moves again to the secondary acquisition mode at step S2.

In the step S3, the threshold value may be set at X' % ($X' \neq X$) rather than at X %.

If it is decided at step S3 that the correlation detection power is less than the threshold, the processing returns to the primary acquisition mode at step S1.

Thus, in the acquisition processing at step S1, the search is performed with respective chip phases over one spreading code period. In the secondary processing at step S2, however, the correlation detection is carried out only at the spreading code replica phase at which the maximum correlation detection peak is obtained at step S1. Accordingly, the acquisition time is approximately equal to the integration time. Furthermore, since the processings in the secondary and third acquisition modes are provided at steps S2 and S3, the error detection at the primary search at step S1 can be rejected if the correlation detection power is less than the threshold, which makes it possible to reduce the possibility of false alarm.

Figure 4:
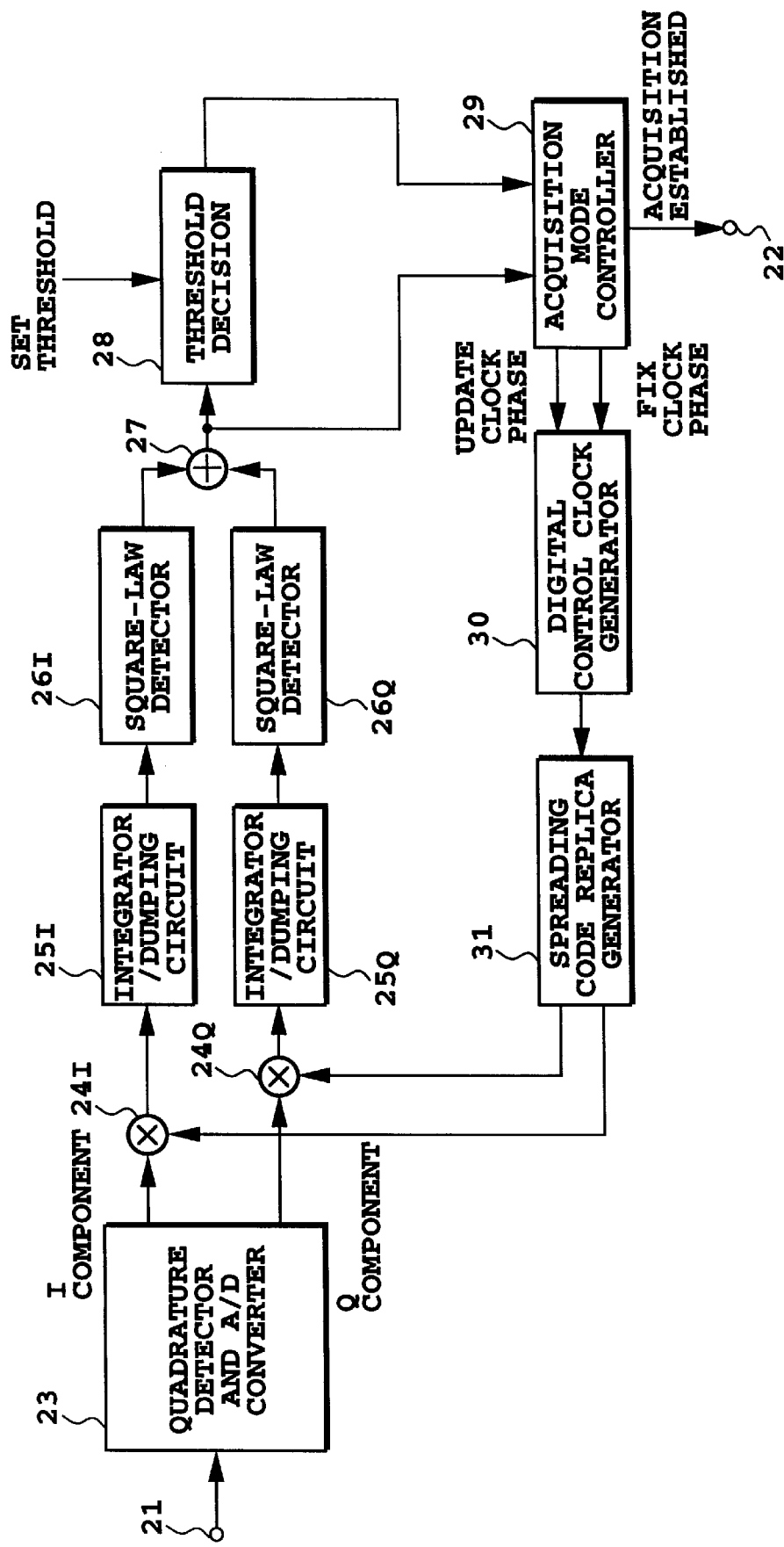
FIG. 4 is a block diagram showing a hardware configuration for implementing the flowchart as shown in FIG. 3.

FIG. 4 shows a hardware configuration for implementing the algorithm as shown in FIG. 3. In this figure, the reference numeral 21 designates an input terminal to which the spread signal is input, 22 designates a signal output terminal from which a signal is output indicating that the acquisition has been established, 23 designates a quadrature detector and A/D converter, 24I and 24Q each designate a multiplier, 25I and 25Q each designate an integrator/dump circuit, 26I and 26Q each designate a square-law detector, 27 designates an adder, 28 designates a threshold decision circuit, 29 designates an acquisition mode controller, 30 designates a digital control clock generator, and 31 designates a spreading code replica generator. Here, the character I designates the in-phase component of the received signal, and Q designates the quadrature component thereof.

Next, the operation of the system as shown in FIG. 4 will be described. First, the I and Q channel signals which have undergone the quadrature detection are deprived of their harmonic components, and converted into digital values by the A/D converter 23. The I and Q channel signals are multiplied by the spreading code replica by the multipliers 24I and 24Q, respectively, and then integrated over one spreading code period by the integrator/dump circuits 25I and 25Q. The integrated signals are square-law detected, followed by removing data modulation components and residual carrier frequency components. The power of a signal produced by adding the square-law detected signals is obtained over one spreading code period (while updating the clock phase of the digital control clock generator 30), and resultant signal power values are stored in the memory circuit in the primary acquisition mode controller 29. After that, the clock phase of the digital control clock generator 30 is fixed at the spreading code replica phase at which the maximum correlation peak (power) is obtained over the one spreading code period.

Subsequently, the confirmation mode of the spreading code acquisition phase is started in accordance with the algorithm described above. The tracking is carried out by a DLL (Delay Locked Loop) as shown in FIG. 5 after the acquisition has been established, that is, when the positive decision (YES) is made at step S2.

Figure 5:
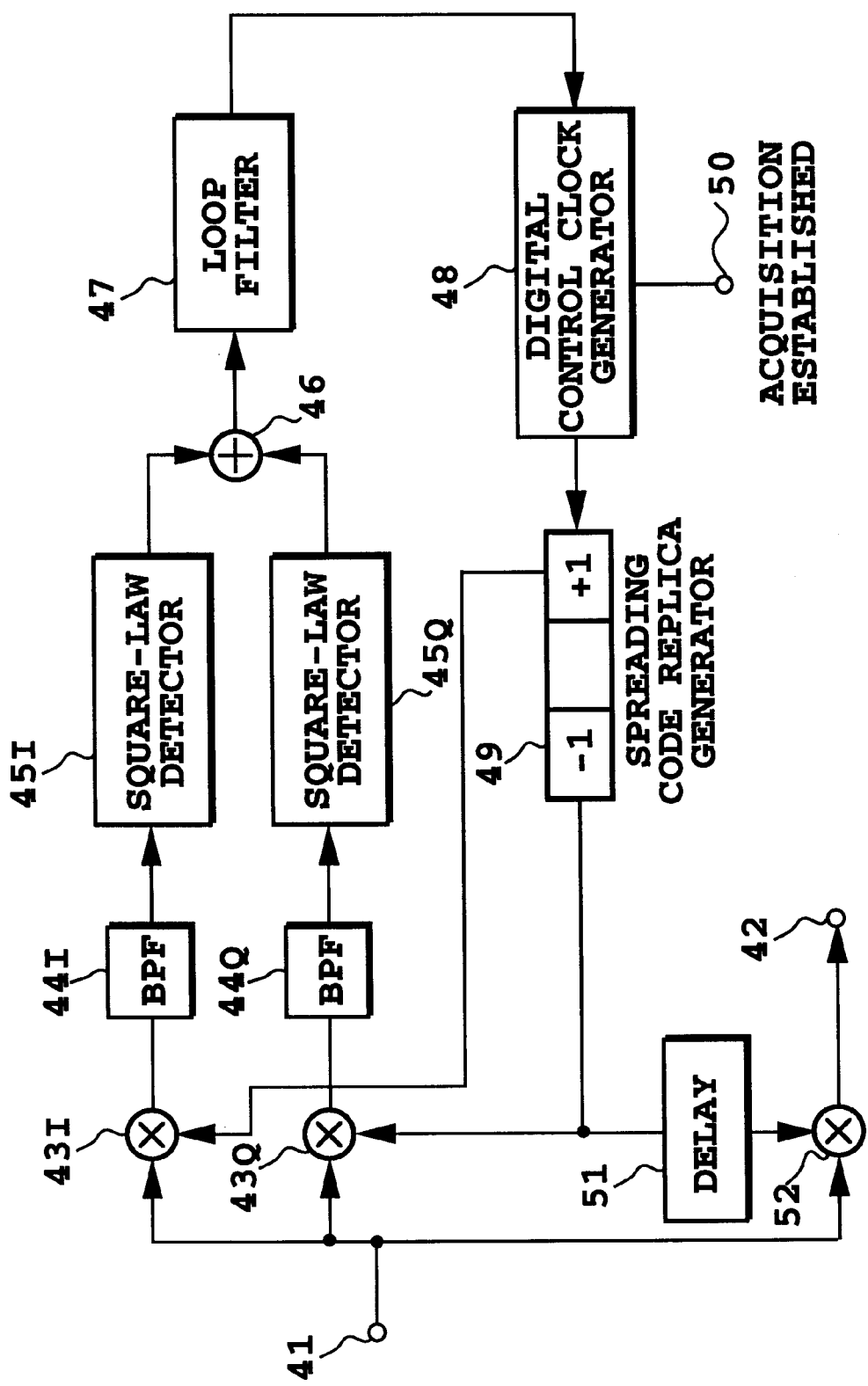
FIG. 5 is a block diagram showing an example of a DLL circuit used for implementing the first embodiment of the present invention.

FIG. 5 is a block diagram showing details of the DLL circuit. In this figure, the reference numeral 41 designates an input terminal of the spread signal, 42 designates an output terminal of a despread signal, 43I and 43Q each designate a multiplier, 44I and 44Q each designate a BPF, 45I and 45Q each designate a square-law detector, 46 designates an adder, 47 designates a loop filter, 48 designates a digital control clock generator, 49 designate a spreading code replica generator, 51 designate a delay circuit, and 52 designates a multiplier.

The circuit of FIG. 5 detects the correlation between the received spreading code and a spreading code replica whose phase is advanced by one chip with regard to the synchronized spreading code, and between the received spreading code and a spreading code replica whose phase is lagged by one chip with regard to the synchronized spreading code. Subsequently, the correlation signals are square-law detected by the detectors 45I and 45Q, and then added in reversed phase, followed by the removal of the harmonics by the loop filter 47 whose output is fed back to the digital control clock generator 48 to adjust the phase of the spreading code replica.

Figure 6B:
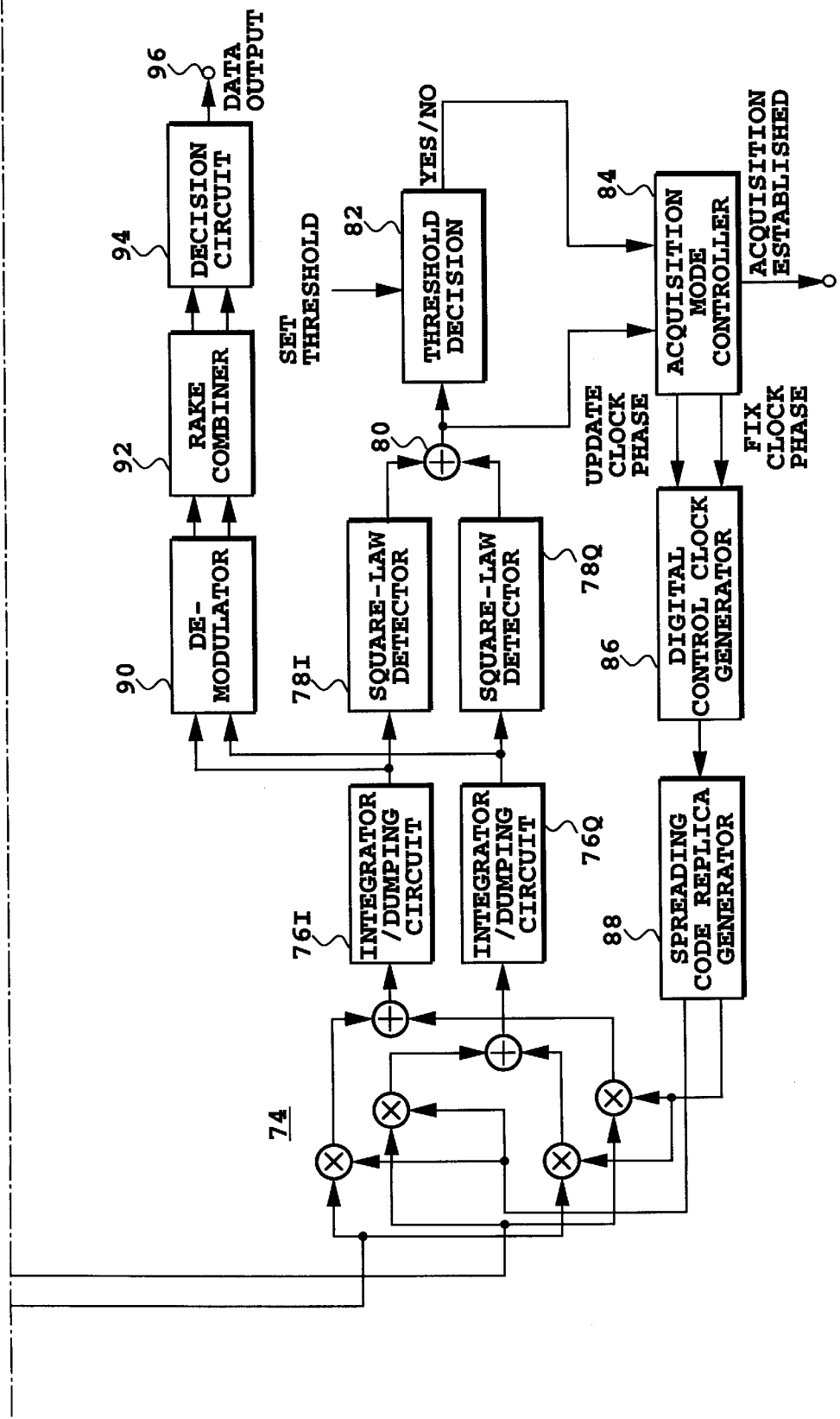

FIGS. 6A and 6B are block diagrams showing the overall configuration of a receiver into which hardware is incorporated having the same function as the circuit shown in FIG. 4.

In FIGS. 6A and 6B, the reference numeral 60 designates a receiving antenna, 61 designates a low-noise amplifier, 62 designates a BPF (bandpass filter), 63 designates a mixer, 64 designates a local oscillator, 65 designates a BPF, 66 designates an AGC amplifier, 67 designates a quadrature detector, 68 designates a local oscillator, 70I and 70Q each designate an LPF (lowpass filter), 72I and 72Q each designate an A/D converter, 74 designates multipliers and adders, 76I and 76Q each designate an integrator/dump circuit, 78I and 78Q each designate a square-law detector, 80 designates an adder, 82 designates a threshold decision circuit, 84 designates an acquisition mode controller, 86 designates a digital control clock generator, 88 designates a spreading code replica generator, 90 designates a demodulator, 92 designates a RAKE combiner, 94 designates a decision circuit, and 96 designates a data output terminal.

The operation of the receiver as shown in FIGS. 6A and 6B is as follows.

The input signal of the receiver obtained by the antenna 60 is frequency converted into intermediate frequency (IF), and then linearly amplified by the AGC amplifier 66 to a signal of about a few hundred millivolts. Subsequently, it is quadrature detected by the quadrature detector 67 using a local signal whose frequency is equal to the central frequency of the spread modulated signal. The quadrature detected in-phase (I) and quadrature (Q) components of the spread modulated signal are deprived of the harmonics, and converted into the digital values by the A/D converters 72I and 72Q. The I and Q channel signals are independently multiplied by the spreading code replica, and integrated over one spreading code period. The integrated signals are square-law detected, and added by the adder 80 which outputs the correlation detection signal.

The acquisition process at step S1 described above carries out searching at individual chip phases over one spreading code period, and holds the replica phase (P0) at which the correlation detection power becomes maximum. Since the process at the next step S2 immediately starts the correlation detection using the phase (P0) of the received spreading code replica obtained at step S1, it takes only the time interval required for the integration.

At step S2 (see, FIG. 3), when the correlation detection value exceeds the threshold power, the decision is made that the acquisition is established, and the processing leaves the confirmation mode (the secondary acquisition mode) to enter the tracking mode at step S4. On the other hand, when the correlation detection value does not exceed the threshold power, the correlation detection is carried out again using the spreading code replica phase obtained by the correlation detection in the primary acquisition mode in the third acquisition mode at step S3. If the correlation detection power obtained exceeds the threshold power determined in accordance with the peak power obtained at the primary acquisition mode, the processing is again transferred to the secondary acquisition mode at step S2. On the other hand, if the correlation detection power is smaller than the threshold value, the processing returns to the primary acquisition mode at step S1.

SECOND EMBODIMENT IN ACCORDANCE WITH THE PRESENT INVENTION

A second embodiment described from now on relates to a DS-CDMA transmission system, in which pilot symbols of a known pattern are inserted into a transmitted signal at fixed intervals for detecting at a receiving side the transfer function of a transmission path. The correlation is detected between the spreading code included in a received signal and a spreading code replica generated at the receiver side to detect the synchronization of the spreading codes. Subsequently, the receiver side makes confirmation decision whether the synchronization of the spreading code is truly established depending on whether or not the frame synchronization using the pilot symbols can be detected.

According to the embodiment, the decision accuracy can be improved by confirming the spreading code synchronization by the frame synchronization using the pilot symbol in the spreading code synchronization process (acquisition) in the DS-CDMA transmission system.

The present embodiment will now be described in more detail referring to FIG. 7.

Figure 7:
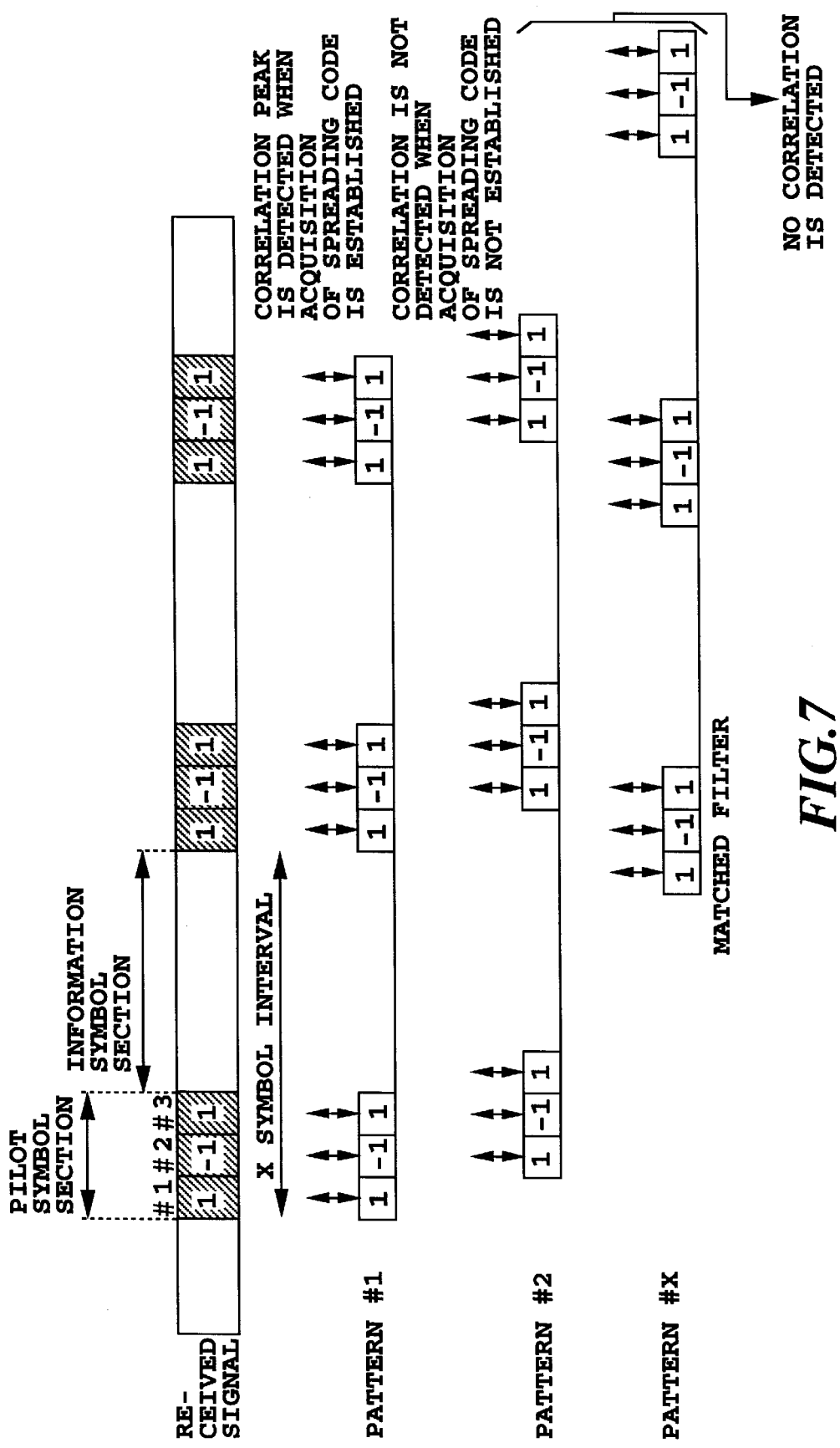
FIG. 7 is a diagram illustrating a second embodiment in accordance with the present invention.

In FIG. 7, a set of three symbols is inserted into information symbols at every X symbol interval, that is, (X−3) information symbols and three pilot symbols are transmitted alternately.

In the receiver, establishing the spreading code synchronization usually results in establishing the symbol synchronization. This is because when the spreading code is a short code, the head of the spreading code corresponds to that of the symbol, and when the spreading code has a period longer than the symbol (when it is a long code), it can be handled by predetermining which long code phase corresponds to the head of the symbol. Thus, it is assumed that the symbol synchronization has already been established in the description below.

In FIG. 7, each set of pilot symbols is transmitted in a pattern {1, −1, 1} which is known to the receiver. The receiver, after establishing the spreading code synchronization, detects the correlation between the pilot symbols and a despread signal, symbol by symbol, by a correlator (not shown) consisting of a matched filter having taps whose number equals the number of the pilot symbols. To improve the accuracy of the correlation value obtained, the average correlation value is detected by the correlator at every X symbol interval as shown in FIG. 7. In this case, it is necessary to prepare X types of correlation detection patterns with an X symbol period as shown in FIG. 7 to meet the need when the position of the pilot symbols cannot be identified in advance.

Let us assume that the spreading code synchronization is correctly detected. In this case, a particular pattern, for example pattern #1 in FIG. 7, is in synchronism with the pilot symbols in the received signal during the correlation detection, thereby outputting a large correlation value. If the correlation is detected between the received signal and the other patterns, only much smaller correlation values are obtained because the information symbols take random values. For this reason, it is possible to confirm the spreading code synchronization besides the pilot symbol synchronization by detecting the correlation between the received signal and the X patterns, which results in a large correlation value at a particular pattern when the spreading code synchronization is correctly detected.

Reversely, let us assume that the spreading code synchronization is not detected correctly. In this case, since the symbol synchronization is not detected correctly, the particular pattern such as pattern #1 is not present in the correlation detection with the X patterns, resulting in only small correlation detection values. Accordingly, the receiver recognizes that the spreading code synchronization is wrong, thus restarting the spreading code synchronization processing.

In the foregoing description, the position of the pilot symbols are not known. However, when using a long code as the spreading code, the received timing of the pilot symbols can sometimes be identified from the phase of the long code when the long code period is an integer multiple of the X symbol interval. In this case, the correlation detection is achieved by taking a correlation with a corresponding single pattern, in which a decision is made that the spreading code synchronization is correctly detected if the correlation value is large, and that the spreading code synchronization is not correctly detected if the correlation value is small.

The present embodiment can be carried out immediately before the tracking mode as shown in FIG. 3 (step S4), or in parallel with the tracking mode.

While the present invention has been described in detail with respect to preferred embodiments, it will be understood that other embodiments will be made without departing from the scope of the invention.

INDUSTRIAL APPLICABILITY

As described above, according to the present invention, the acquisition can be established in a short time with a low error probability, thereby enabling the tracking mode to be started soon, because it is possible for the receiver in the DS-CDMA communications to provide the confirmation mode for confirming the establishment of the spreading code synchronization.

What is claimed is:

1. An acquisition method of a spreading code comprising the steps of:
   receiving a wideband spread signal generated using a spreading code with a rate higher than an information rate;
   performing a first correlation detection between a received signal and a spreading code replica at a received side by detecting a maximum correlation output by carrying out a search at respective chip phases over one spreading code period; and
   determining whether acquisition of the spreading code is established by performing a second correlation detection at a spreading code phase at which said maximum correlation output is detected wherein acquisition establishment is determined when signal power is obtained exceeding said maximum correlation output,
   wherein if a decision is made after said second correlation detection that the acquisition has not been established, performing a third correlation detection at the spreading code phase at which said maximum correlation output is detected.

2. The acquisition method of the spreading code of claim 1, wherein said maximum correlation output is information of power obtained by calculating correlation between said spreading code replica and I component of said received signal and correlation between said spreading code replica and Q component of said received signal, by square-law detecting the two correlations, and by adding square-law detected outputs.

3. The acquisition method of the spreading code of claim 1, wherein if a decision is made after said third correlation detection that the acquisition has not been established, repeating said maximum correlation output detection, and if a decision is made after said third correlation detection that the acquisition has been established, repeating said second correlation detection.

4. The acquisition method of the spreading code of claim 1, wherein if a decision is made after performing said second correlation detection that the acquisition has been established, further comprising the step of executing a tracking mode.

5. An acquisition method of a spreading code in a direct sequence CDMA system, in which a pilot symbol of a known pattern for detecting a transfer characteristic of a transmission path at a receiving side is inserted into a transmission signal at a fixed interval, said acquisition method comprising the steps of:
   synchronizing a spreading code received at the receiving side with a spreading code replica generated at the receiving side by detecting correlation between said spreading code and said spreading code replica; and
   confirming establishment of the synchronization of said spreading code with said spreading code replica depending on whether a frame synchronization can be detected using said pilot symbol.

6. A spreading code synchronization system comprising:
   a wideband spread signal receiver, receiving a wideband spread signal generated using a spreading code with a rate higher than an information rate; and
   a processor coupled to the wideband spread signal receiver, wherein the processor is programmed to:

perform a first correlation between the received wideband spread signal and a spreading code replica generated at a receiving side by detecting a maximum correlation output by carrying out a search at respective chip phases over one spreading code period, determine whether acquisition of the spreading code is established by detecting a second correlation at a spreading code phase at which said maximum correlation output is detected wherein acquisition establishment is determined when signal power is obtained exceeding said maximum correlation output, and detect a third correlation at the spreading code phase at which said maximum correlation output is detected, if a determination is made after detecting said second correlation that the acquisition has not been established.

7. The spreading code synchronization system of claim 6, wherein said maximum correlation output detected is information of power obtained by calculating correlation between said spreading code replica and I component of said received signal and correlation between said spreading code replica and Q component of said received signal, by square-law detecting the two correlations, and by adding square-law detected outputs.

8. The spreading code synchronization system of claim 6, wherein the processor further programmed to repeat said maximum correlation detection if after said third correlation detection it is determined that the acquisition has not been established, and repeat said second correlation detection if after said third correlation detection it is determined that the acquisition has been established.

9. The spreading code synchronization system of claim 6, wherein said processor further programmed to execute a tracking mode if after said second correlation detection it is determined that the acquisition has been established.

10. A spreading code synchronization system in a direct sequence CDMA system, in which a pilot symbol of a known pattern for detecting a transfer characteristic of a transmission path at a receiving side is inserted into a transmission signal at a fixed interval, said spreading code synchronization system confirming that an acquisition is established at the receiving side, said spreading code synchronization system comprising:

a receiver; and a processor coupled to the receiver, wherein the processor is programmed to:

synchronize a spreading code received by the receiver with a spreading code replica generated at the receiving side by detecting correlation between said spreading code and said spreading code replica, and confirming, after establishing synchronization, whether the synchronization of said spreading code with said spreading code replica is truly established depending on whether a frame synchronization can be detected using said pilot symbol.

11. A spreading code synchronization system comprising:

a correlator for detecting correlation between a spreading code in a spread spectrum signal which is spread into a wideband signal using the spreading code with a rate higher than an information rate, and a spreading code replica at a receiving side by detecting a maximum correlation peak power by carrying out correlation detection at respective spreading code phases over a first spreading code period;

a storage device for holding a phase of said spreading code replica at which said maximum correlation peak power is detected by said correlator;

a first detector for carrying out, at a second spreading code period, correlation detection at said phase of said spreading code replica held in said storage device;

a first comparator for carrying out first threshold decision by comparing a first correlation detection power obtained by said first detector and a first threshold value corresponding to said maximum correlation peak power obtained by said correlator, wherein a decision is made that the acquisition is established when said first comparator determines that said first correlation detection power exceeds said first threshold value;

a second detector for carrying out correlation detection at said phase of said spreading code replica held in said storage device; and a second comparator for carrying out second threshold decision by comparing a second correlation detection power obtained by said second detector and a second threshold value corresponding to said maximum correlation peak power obtained by said correlator, wherein said second comparator determines that the acquisition is established when said second correlation detection power exceeds said second threshold value, wherein if said second comparator determines that said second correlation detection power exceeds said second threshold value, the correlation detection by said first detector is carried out, and wherein if said second correlation detection power does not exceed the second threshold value, said correlation detection over one spreading code period is restarted by said correlator.

12. The spreading code synchronization system of claim 11, wherein said first threshold value is equal to said second threshold value.

* * * * *